United States Patent
Van Moorsel

[11] 3,922,222
[45] Nov. 25, 1975

[54] METHOD FOR TREATMENT OF UREA CRYSTALLIZER CONDENSATE

[75] Inventor: William H. Van Moorsel, Allegheny, N.Y.

[73] Assignee: CF Industries, Inc., Chicago, Ill.

[22] Filed: Feb. 20, 1973

[21] Appl. No.: 334,065

[52] U.S. Cl. ............... 210/71; 203/11; 260/555 A
[51] Int. Cl.² ................................. C02B 1/02
[58] Field of Search .......... 210/45, 48, 56, 71, 176, 210/180; 203/11, 14; 260/555 A, 555 B; 55/55, 68, 70

[56] References Cited
UNITED STATES PATENTS

| | | | |
|---|---|---|---|
| 1,650,129 | 11/1927 | Jacobus | 210/180 |
| 3,258,486 | 6/1966 | Cook | 260/555 A |
| 3,270,050 | 8/1966 | Mavrovic | 260/555 A |
| 3,636,106 | 1/1972 | Villiers et al. | 260/555 A |

OTHER PUBLICATIONS
Merck Index, 6th Edition, p. 988.

Primary Examiner—Frank A. Spear, Jr.
Assistant Examiner—Peter A. Hruskoci
Attorney, Agent, or Firm—Olson, Trexler, Wolters, Bushnell & Fosse, Ltd.

[57] ABSTRACT

Condensate from a urea crystallizer is directed to a low pressure boiler or heat exchanger and evaporated to accomplish thermal decomposition of urea and any biuret contained therein into ammonia and carbon dioxide which are subsequently removed and recycled to the urea plant, if desired, leaving substantially urea free water of sufficient quality to satisfy environmental regulations or guidelines or for use as boiler feed water.

7 Claims, 1 Drawing Figure

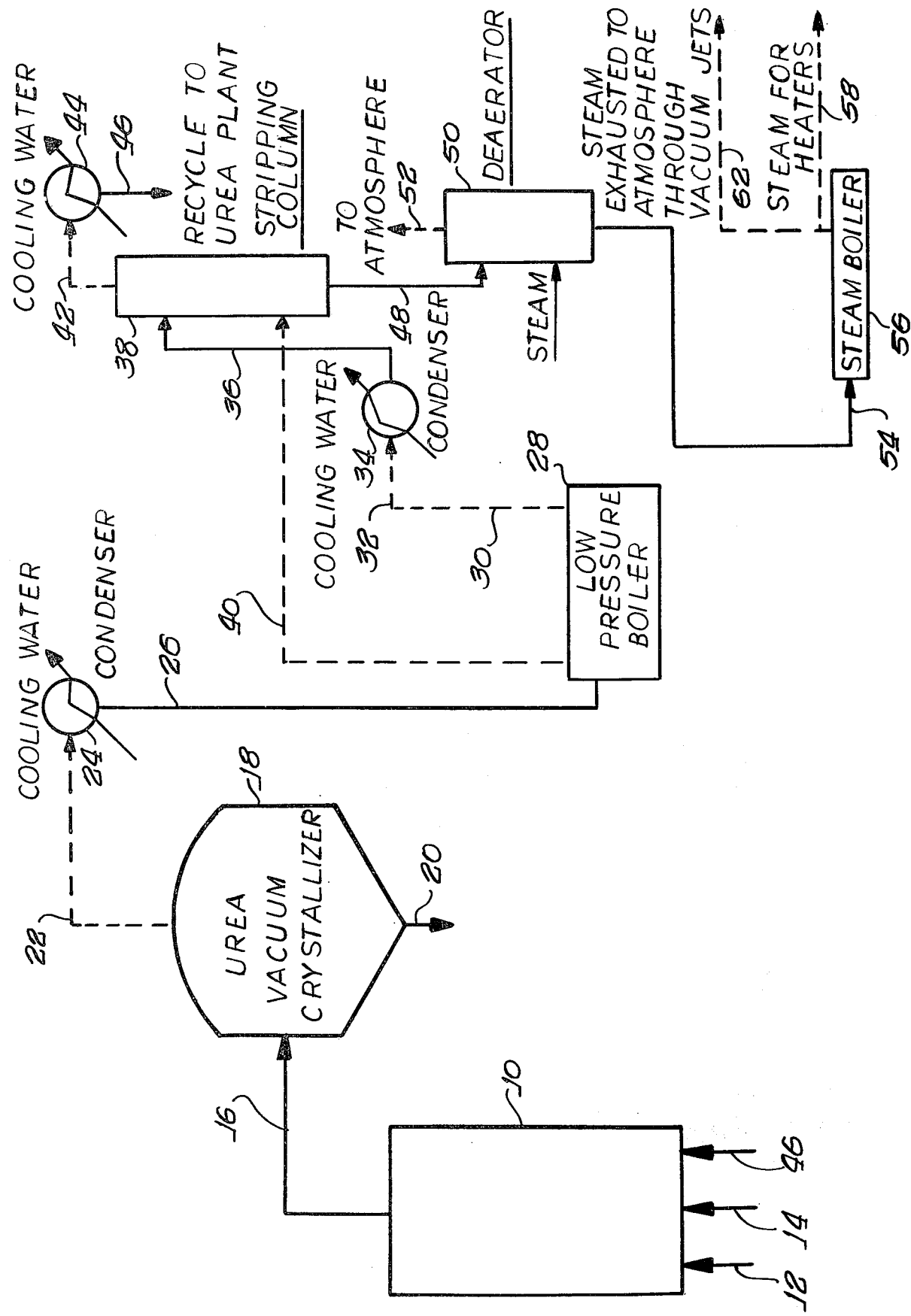

METHOD FOR TREATMENT OF UREA CRYSTALLIZER CONDENSATE

The present invention relates to the production of urea, and more specifically to the treatment of condensate from a urea crystallizer for removing contaminants such as ammonia and urea therefrom.

As is well known, urea is conventionally produced by reacting ammonia and carbon dioxide under high temperatures or pressures. The output of the reactor is directed to a vacuum crystallizer from which the desired products such, for example, as a 74% urea solution is withdrawn. The process also forms large amounts of water which is removed from the vacuum crystallizer as vapor along with relatively small but contaminate amounts of ammonia, carbon dioxide and urea. Heretofore this water and the contaminants have frequently been condensed and simply dumped. However, the dumping of untreated and comtaminated urea plant condensate is a source of water pollution and efforts have been made to treat the condensate so as to remove the contaminates. Heretofore, such efforts have not been satisfactory since they have resulted in materially increased operating costs and/or significant additional costs for new equipment.

It is an important object of the present invention to provide a novel method for treating urea plant condensate for removing the contaminants therefrom economically and effectively.

A more specific object of the present invention is to provide a novel method for treating urea plant condensate in a manner which will remove the contaminants therefrom sufficiently to enable the resulting water to satisfy environmental standards and/or to be used as boiler feed water, if desired.

A still further object of the present invention is to provide a novel method for treating urea plant condensate in a manner causing the urea therein to be decomposed into ammonia and carbon dioxide which may be separated from the condensate and recycled to the urea plant.

Still another object of the present invention is to provide a novel method for treatment of urea plant condensate as described above which may be incorporated in existing plans relatively easily and economically In accordance with the present invention it is contemplated that condensate from a crystallizer of a urea plant is to be treated by being directed to a low pressure boiler or other heat exchanger operating, for example, at a pressure of 10 p.s.i.a., in which the condensate which normally contains contaminating ammonia and non-volatile urea and possibly some biuret is heated and vaporized. The condensate is retained in the low pressure boiler or heat exchanger at a sufficient temperature and pressure and for a sufficient time to cause the urea to decompose into ammonia and carbon dioxide. In other words the non-volatile urea which is difficult to remove, is converted into volatile constituents which may be easily removed. Vapor from the low pressure boiler or heat exchanger is at least partially condensed and directed to a stripping column which removes most of the ammonia and carbon dioxide for recycling to the urea plant. The condensate or water from the stripping column still carries a relatively small amount of ammonia and is preferably directed through a deaerator where it is heated sufficiently to drive off most of the ammonia. The resulting treated water contains no contaminating urea and, at most, an insignificant amount of ammonia whereby it may be dumped, if desired, or used as boiler feed water.

Other objects and advantages of the present invention will become apparent from the following description and the accompanying drawing which is a schematic flow sheet showing an apparatus for carrying out the process of this invention.

Referring now more specifically to the drawing, apparatus according to the present invention is shown in association with a urea plant which includes a conventional reactor 10 for receiving carbon dioxide and ammonia from suitable sources of supply 12 and 14. The carbon dioxide and ammonia are reacted under high temperatures and pressure which may, for example, be on the order of 3,000 p.s.i. in the vessel 10 for producing urea and water.

The product of the reactor 10 is directed through conduit 16 to a vacuum crystallizer 18 of known construction. In a preferred embodiment, a 74% urea solution is withdrawn from the crystallizer through conduit 20. Water vapor along with relatively small but contaminating amounts of ammonia, carbon dioxide and urea is discharged through conduit 22 and is directed to a cooler 24 of known construction which condenses the vapor.

The condensate from the cooler 24 is directed through conduit 26. This condensate is principally water, but contains contaminating amounts of ammonia and urea. For example, when operating the urea plant at full rate under preferred conditions, a pressure of 1.5 p.s.i.a. and temperature of 125°F is maintained in the vacuum crystallizer 18 and the condensate in the line 26 from the crystallizer comprises 7,000 pounds per hour water, 70 pounds per hour ammonia, and 7 pounds per hour urea. In accordance with the present invention the condensate is processed as described below so as eventually to eliminate the urea and the ammonia from the water.

The condensate is directed by the conduit 26, to a low pressure boiler or other heat exchange 28 where it is heated and discharged as vapor to conduit 30.

The low pressure boiler or heat exchanger 28 may be of known construction having portions thereof which contact the condensate formed from stainless steel or some other suitable material which will not be adversely affected by the ammonia and urea present in the condensate. As indicated, the boiler is operated at relatively low pressures and temperatures. In a preferred embodiment of the invention, the boiler or heat exchanger is operated at a pressure of about 8.4 p.s.i. absolute and at a temperature of 185°F. The condensate is evaporated and at the same time the urea is thoroughly decomposed into ammonia and carbon dioxide so that, in the example being described herein, the flow through the discharge conduits 30 and 40 from the boiler comprises 7,000 pounds per hour of water, 74 pounds per hour of ammonia and about 3 pounds per hour of carbon dioxide.

A major portion of the vapor which in the present example comprises about 6,500 pounds per hour of water and a proportionate share of the ammonia and carbon dioxide is directed by a branch line 32 to a condenser 34 and from the condenser through line 36 to a stripping column 38 of known construction. The remainder of the vapor is directed to branch line 40 to the lower portion of the stripping column. The stripping column may comprise any known construction capable of functioning to remove most of the ammonia and carbon dioxide from the water. For example, with the flow rates previously indicated, the stripping column functions so that approximately 64 pounds per hour of ammonia and a proportionate amount of carbon dioxide along with about 500 pounds per hour of water are discharged through line 42. This discharge is in the form of vapor and is passed through a condenser 44 and is directed by line 46 for recycling back to the reactor 10 of the urea plant.

Water is discharged from the stripping column through line 48. While this water has had most of the ammonia removed therefrom, a small amount remains. In the example given, condensed water is discharged through line 48 at a rate of about 6,500 pounds per hour along with about 10 pounds per hour of ammonia. Preferably this condensate is directed to a deaerator 50. This unit is of known construction and is such that most of the ammonia and a portion of the liquid are vaporized and vented through the atmosphere through vent 52, while the remainder of the water with a very small residual amount of ammonia is directed through line 54. This essentially uncontaminated water may be dumped, if desired, but it is preferably directed to a high pressure boiler 56 and provides at least a portion of the boiler feed water. In the example given herein, approximately 1,000 pounds per hour of water vapor along with 8.5 pounds per hour of ammonia are vented from the deaerator which is operated at 65 p.s.i. absolute and 298°F, while 5,500 pounds per hour or more and 1.5 pounds per hour ammonia are directed to the high pressure boiler.

Steam from the high pressure boiler may be utilized for any desired purpose. For example, a portion of the steam may be directed from the boiler through lines 58 and 60 for use in various heaters in the urea plant or elsewhere. Another portion of the high pressure steam may be directed to branch line 62 and exhausted through the atmosphere through vacuum jets which are used to maintain a vacuum in the various parts of the urea or other plant processes. It has been found that the ammonia concentration in the steam reaches an equilibrium of about 300 ppm. and at the flow rate set forth herein about 250 pounds per day of ammonia is exhausted to the atmosphere through the deaerator vent and the vacuum jet.

While a preferred embodiment of the present invention has been disclosed herein, it is obvious that many of the details may be changed without departing from the spirit and the scope of the amended claims. For example, the various flow rates, temperatures and pressures are given by way of example only and they may vary in accordance with the particular capacity of the urea plant and pieces of equipment utilized.

The invention is claimed as follows:

1. A process for removing nonvolatile contaminants such as urea and biuret from urea plant condensate comprising a mixture of condensed water and very small amounts of urea on the order of about 0.1% of the condensate, said process comprising the steps of introducing said condensate into a low pressure boiler, heating said condensate of water and the urea under conditions of times, low temperatures and pressures which are sufficient to thermally decompose urea essentially completely and thereby decomposing the urea in said condensate into ammonia and carbon dioxide essentially completely vaporizing said condensate, and thereafter separating substantial portions of the ammonia and carbon dioxide from resultant vaporized water of said condensate, by condensing at least a major portion of the vaporized condensate, and stripping ammonia and carbon dioxide from the water in said major portion.

2. A process, as defined in claim 1, which includes recycling the ammonia and carbon dioxide to the urea plant.

3. A process, as defined in claim 1, which includes utilizing the water from which the ammonia and carbon dioxide has been separated as boiler feed water.

4. A process, as defined in claim 1, wherein resultant water from said stripping contains a relatively small amount of ammonia, said process comprising the further step of heating said resultant water and venting the ammonia therefrom to the atmosphere.

5. A process as defined in claim 1, wherein the pressure at which the condensate is heated and vaporized in order to decompose the urea is on the order of 10 p.s.i.a.

6. A process as defined in claim 5 wherein said pressure is about 8.4 p.s.i.a.

7. The process as defined in claim 6 wherein the heating and vaporizing of said condensate is conducted at about 185°F.

* * * * *